United States Patent
Zaniboni et al.

(10) Patent No.: US 9,642,335 B2
(45) Date of Patent: May 9, 2017

(54) VERTICAL COMBINED SHREDDING AND MIXING TRUCK

(71) Applicants: SOCIETA' AGRICOLA SACCHINA DI BONI DINO E BRUNO S.S, Castellucchio (IT); COMAG S.R.L., Roncoferraro (IT)

(72) Inventors: Ivano Zaniboni, Roncoferraro (IT); Dino Boni, Castellucchio (IT)

(73) Assignee: SOCIETA' AGRICOLA SACCHINA DI BONI DINO E BRUNO S.S., Castellucchio (IT)

( * ) Notice: Subject to any disclaimer, the term of this patent is extended or adjusted under 35 U.S.C. 154(b) by 240 days.

(21) Appl. No.: 14/401,919

(22) PCT Filed: May 17, 2013

(86) PCT No.: PCT/IB2013/054041
§ 371 (c)(1),
(2) Date: Nov. 18, 2014

(87) PCT Pub. No.: WO2013/171717
PCT Pub. Date: Nov. 21, 2013

(65) Prior Publication Data
US 2015/0122926 A1    May 7, 2015

(30) Foreign Application Priority Data
May 18, 2012   (IT) .............................. VR2012A0102

(51) Int. Cl.
*B02C 18/00*   (2006.01)
*A01K 5/00*   (2006.01)
(Continued)

(52) U.S. Cl.
CPC ............ *A01K 5/004* (2013.01); *A01F 29/005* (2013.01); *A01F 29/10* (2013.01); *A01K 5/0258* (2013.01); *B02C 18/067* (2013.01)

(58) Field of Classification Search
CPC ...... A01K 5/004; A01F 29/005; B02C 18/067
(Continued)

(56) References Cited

U.S. PATENT DOCUMENTS 3,325,106 A * 6/1967 Hoffman, Jr. ............. B02C 7/00
                                                  241/101.5
4,432,499 A * 2/1984 Henkensiefken ...... A01K 5/004
                                                  241/101.76
(Continued)

FOREIGN PATENT DOCUMENTS

DE    202004011784 U1   10/2004
EP        1 224 859 A1    7/2002
EP        2 319 299 A2    5/2011

OTHER PUBLICATIONS

International Search Report and Written Opinion dated Aug. 8, 2013 issued in PCT/IB2013/054041.

*Primary Examiner* — Faye Francis
(74) *Attorney, Agent, or Firm* — Scully, Scott, Murphy & Presser, P.C.

(57) ABSTRACT

A vertical combined shredding and mixing truck, adapted to shred fibrous products such as hay or straw and to mix them with ensiled and farinaceous products to provide the mechanized feeding of dairy cows and fattening cows, including, within an outer enclosure, at least one vertical motorized screw feeder, which is provided with applied blades and an outlet for discharging the mixed product; there is at least one device which including an idle rotor which is provided with tools adapted to come into contact with the product being processed and is integral with the at least one screw feeder, protruding from the outer edge of said screw feeder.

7 Claims, 2 Drawing Sheets

(51) Int. Cl.
*A01F 29/10* (2006.01)
*A01F 29/00* (2006.01)
*B02C 18/06* (2006.01)
*A01K 5/02* (2006.01)

(58) Field of Classification Search
USPC .................................... 241/101.761, 101.8
See application file for complete search history.

(56) References Cited

U.S. PATENT DOCUMENTS

| | | | | |
|---|---|---|---|---|
| 4,509,862 | A * | 4/1985 | High | B01F 7/24 |
| | | | | 241/101.71 |
| 4,949,916 | A * | 8/1990 | Wroblewski | B02C 17/10 |
| | | | | 241/152.1 |
| 5,294,064 | A * | 3/1994 | Faccia | A01F 29/005 |
| | | | | 241/101.6 |
| 5,647,665 | A * | 7/1997 | Schuler | A01K 5/004 |
| | | | | 241/101.76 |
| 5,803,375 | A * | 9/1998 | Hartwig | A01F 29/005 |
| | | | | 241/101.761 |
| 7,004,617 | B2 * | 2/2006 | Albright | A01K 5/004 |
| | | | | 241/101.761 |
| 7,322,537 | B2 * | 1/2008 | Faccia | A01K 5/004 |
| | | | | 241/101.761 |
| 2011/0110184 | A1 * | 5/2011 | Liet | A01K 5/004 |
| | | | | 366/312 |

* cited by examiner

VERTICAL COMBINED SHREDDING AND MIXING TRUCK

The present invention relates to a vertical combined shredding and mixing truck.

Nowadays the very widespread presence is known of apparatus for the mechanized feeding of dairy cows and of fattening cows called vertical mixing and shredding trucks, which comprise, within an outer enclosure that is open at the top, one or more vertical, motorized screw feeders which are provided with applied blades.

Through the enclosure opening, fibrous products such as straw or hay gathered in cylindrical or prism-shaped bales, and also ensiled and farinaceous products, are introduced into the combined mixing and shredding truck, and the whole is subjected, by the motion of the screw feeders, to an operation of shredding and mixing, so as to obtain a product as uniform as possible which is discharged from a side outlet.

It is precisely a certain lack of uniformity of the product obtained that constitutes a drawback of conventional trucks, with a non-optimal performance in the diet of cows, and thus the aim of the present invention is to provide a vertical combined shredding and mixing truck that is capable of providing a product with great uniformity, so as to enable an optimal feeding of cows, and in this manner obtain a significant increase in the production of milk by those cows.

The set aim is achieved by a vertical combined shredding and mixing truck, according to the invention, characterized in that it comprises the characteristics according to the following claims.

Further characteristics and advantages of the invention will become more apparent from the description of two preferred, but not exclusive, embodiments of the invention, illustrated by way of non-limiting example in the accompanying drawings wherein.

Figure 1:
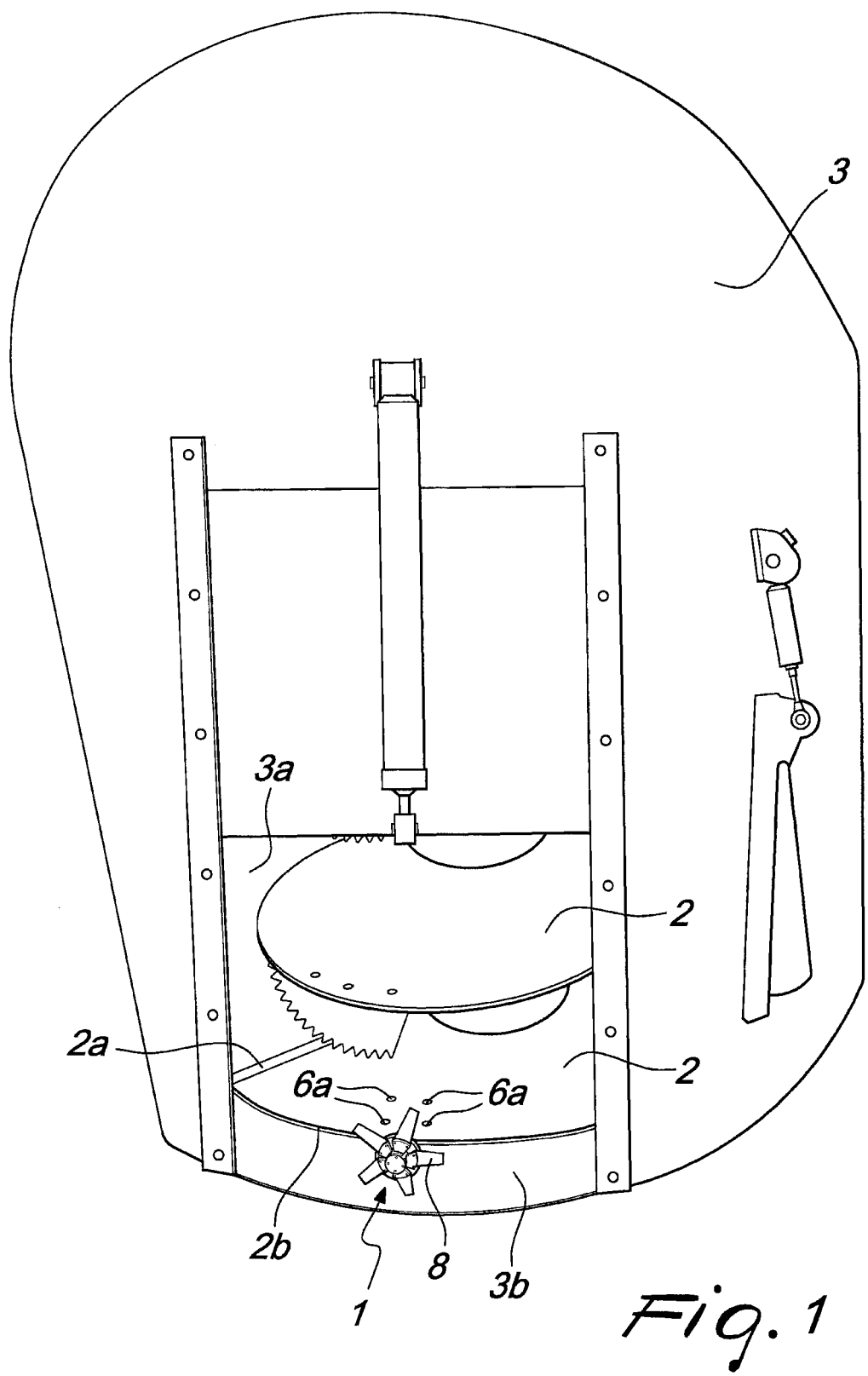
FIG. 1 is a simplified view of the combined shredding and mixing truck with a vertical screw feeder, with the door of the discharge opening raised in order to allow the interior to be seen.
Figure 2:
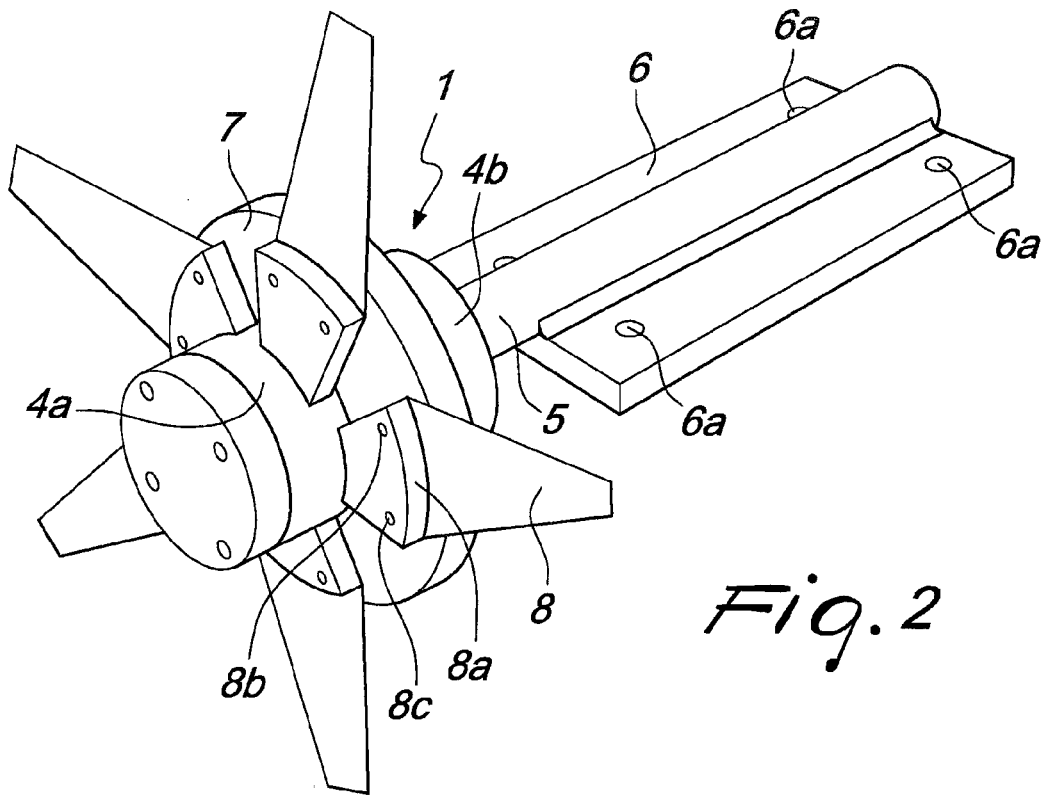
FIG. 2 is a view of a detail of the device applied to the screw feeder visible in FIG. 1.

With reference to FIGS. 1 and 2, the reference numeral 1 generally designates the device according to the invention rendered integral with the motorized vertical screw feeder 2 present within the outer enclosure 3 of the truck, visible through the open outlet 3a of the enclosure.

More precisely, the device 1 is, conveniently, arranged at the initial portion of the screw feeder 2 at the base 3b of the housing 3, proximate to the blade 2a applied at the end of said screw feeder 2.

The device 1 comprises a rotor that is mounted idle, for example thanks to the interposition of two bearings at the portions 4a, 4b, on an axle 5 welded to a plate 6, which is applied at the lower surface of the screw feeder 2 and locked in place by way of bolts inserted in holes like 6a.

Advantageously, the rotor protrudes from the edge 2b of the screw feeder 2, and has a horizontal axis.

More specifically, the rotor is positioned, conveniently, laterally to the screw feeder 2.

Preferably, the rotor is positioned at a distance from the outer enclosure 3 of the truck which is substantially comprised between 80 and 160 mm and, more preferably, between 100 and 130 mm.

Between the two portions 4a and 4b which accommodate the bearings, the rotor comprises a disk 7 that carries integral tools that are adapted to come into contact with the product being processed and are constituted, for example, by five equidistant radial blades such as 8, which are conveniently fixed to the disk by way of plates such as 8a, held in position by way of screws such as 8b and 8c.

The arrangement of the device 1 in the initial portion of the screw feeder 2, i.e. in the region where the mixing action determined by the screw feeder 2 is greatest, is such as to confer great efficiency on the device 1, with the consequent possibility of achieving a high degree of uniformity of the mixed product which becomes particularly soft; in this manner cows are able to considerably increase milk production.

It should be noted that the fact that the rotor is idle makes it possible for it to rotate freely in both directions of rotation about its own axis, as well as to freely vary its velocity, thus avoiding possible sticking, especially in the initial steps of the mixing, when the presence of aggregates in the mass of product to be mixed is most likely.

Also, the possibility still remains of installing a greater number of devices for each screw feeder of the truck.

For example, a plurality of devices 1 can be provided, one of which is integral with the screw feeder 2, at the initial portion of the screw feeder at the base, and the remaining ones at at least one intermediate portion of the screw feeder itself.

Figure 3:
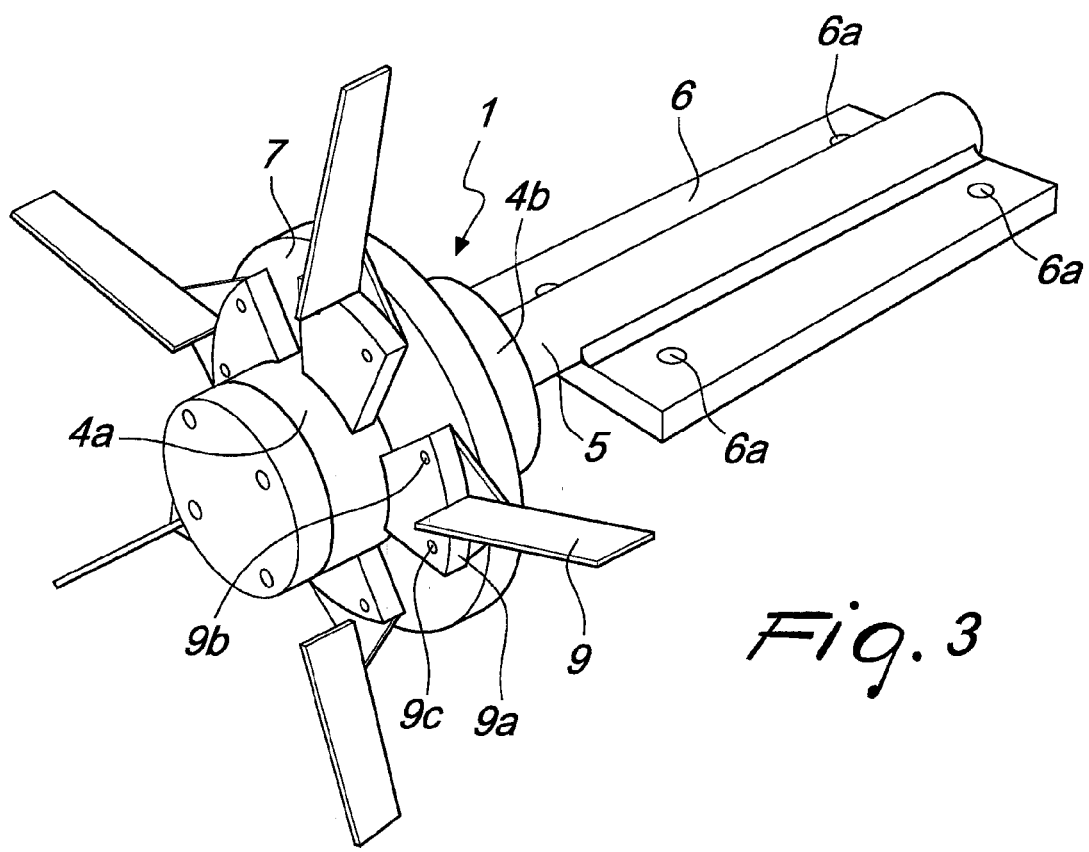
FIG. 3 is a view of a variation of the device.

FIG. 3 represents a variation of the invention in which the tools associated with the rotor, which are adapted to come into contact with the product being processed, are constituted by equidistant and substantially radial vanes such as 9, which are fixed to the disk 7 of the rotor by way of plates such as 9a, which are held in position by screws such as 9b and 9c.

The operation of the truck according to the invention is as follows.

When the outer enclosure 3 has been loaded with the product to be mixed, the screw feeder 2 is actuated in rotation about its own vertical rotation axis.

During the rotation of the screw feeder, the rotor of the device 1, in contact with the product, begins to rotate freely about its own axis, thus causing the movement of the mass of product which is arranged laterally to the region affected by the operation of the screw feeder 2.

In this manner, the rotor constantly causes a mixing action on the mass of product which would otherwise tend to be compacted against the walls of the outer enclosure 3, without being included in the mixing, as typically occurs in the known art.

In practice, the rotation of the rotor makes the mass of product arranged laterally to the screw feeder 2 fall downward, preventing it, among others, from exiting from the upper edge of the outer enclosure 3, and piles it toward the screw feeder 2, which then pushes it upward, with the result that all of the mass of product loaded in the enclosure 3 is in motion during the rotation of the screw feeder 2.

It should be noted that if the rotor should encounter aggregates of the product to be mixed which could cause its sticking, it, being idle, instead of halting, begins to rotate in the other direction or to vary its velocity, thus continuing in its action on the mass of product.

In practice it has been found that the invention is capable of fully achieving the set aim and, in particular, it must be emphasized that, from tests carried out, it is evident that, with the use of the truck according to the invention, it is possible to obtain surprising values of concentration of some components or of other characteristics in the mixed product.

For example, experimental tests conducted both with and without the mixer truck according to the invention have shown that some parameters of the product obtained are significantly influenced positively by the use of the truck according to the invention.

These parameters include the homogeneity of particle size for Screen 8 mm and Pan, Dry Matter, Ash, Protein, NDF, Copper, Sulphur and Phosphorous. For all these parameters, the variability in the composition between the product samples selected during the tests was higher without the use of the truck according to the invention, with the mixture produced using the truck according to the invention being more homogeneous.

In conclusion, the experimental tests have shown that the truck according to the invention makes it possible to increase the homogeneity of feedstuffs constituted by a mixture of solid foods.

The invention, thus conceived, is susceptible of numerous modifications and variations, all of which are within the scope of the appended claims: thus, for example, the idle rotor can be rendered integral with the at least one screw feeder by way of the interposition of a bracket, so as to present a vertical axis, or an axis inclined at any angle.

In practice, all the details may be substituted by other, technically equivalent elements.

The content of Italian patent application no. VR2012A000102, the priority of which is claimed in the present application, is incorporated as a reference.

The invention claimed is:

1. A vertical combined shredding and mixing apparatus, configured to shred fibrous products gathered in cylindrical or prism-shaped bales and to mix the fibrous products with ensiled and farinaceous products to provide mechanized feeding of dairy cows and fattening cows, comprising, within an outer enclosure which extends from a base and is open at a top, a vertical motorized screw feeder, which is provided with applied blades and an outlet for discharging a mixed product, further comprising a rotor that freely rotates about a fixed axle, the rotor comprising tools configured to come into contact with the fibrous product being processed and is integral with the screw feeder, protruding from an outer edge of said screw feeder at an initial portion of the base of the outer enclosure of the screw feeder.

2. The apparatus according to claim 1, wherein the rotor is integral with the screw feeder, the rotor having a horizontal axis.

3. The apparatus according to claim 1, wherein the rotor is integral with the screw feeder, the rotor having an axis which is inclined between a horizontal arrangement and a vertical arrangement.

4. The apparatus according to claim 1, wherein the tools configured to come into contact with the product being processed are constituted by a plurality of equidistant and substantially radial blades.

5. The apparatus according to claim 1, wherein the tools configured to come into contact with the product being processed are constituted by equidistant and substantially radial vanes.

6. The apparatus according to claim 1, further comprising a truck coupled to the vertical combined shredding and mixing apparatus.

7. The apparatus according to claim 1, wherein the fibrous products are hay or straw.

* * * * *